US006536933B1

(12) United States Patent
Gettemy et al.

(10) Patent No.: US 6,536,933 B1
(45) Date of Patent: Mar. 25, 2003

(54) VAPOR DEPOSITION OF REFLECTIVE AND/OR PHOSPHORESCENT MATERIAL IN A LIGHTING SYSTEM

(75) Inventors: Shawn R. Gettemy, San Jose, CA (US); Kevin Lee, San Jose, CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/940,830

(22) Filed: Aug. 27, 2001

(51) Int. Cl.⁷ .................. G02F 1/1335; F12V 9/16
(52) U.S. Cl. .................. 362/561; 362/31; 362/84; 349/63; 349/65; 349/71
(58) Field of Search .................. 362/31, 558, 561, 362/84; 349/61–65, 70, 71

(56) References Cited

U.S. PATENT DOCUMENTS

| 4,648,690 A | * | 3/1987 | Ohe .................. 349/65 |
| 5,408,387 A | * | 4/1995 | Murase et al. .................. 362/31 |
| 5,408,388 A | * | 4/1995 | Kobayashi et al. .................. 362/31 |
| 5,857,761 A | * | 1/1999 | Abe et al. .................. 362/558 |
| 5,961,198 A | * | 10/1999 | Hira et al. .................. 362/31 |
| 6,020,944 A | * | 2/2000 | Hoshi .................. 349/62 |
| 6,340,999 B1 | * | 1/2002 | Masuda et al. .................. 349/63 |
| 2001/0033482 A1 | * | 10/2001 | Funamoto et al. .................. 362/84 |

* cited by examiner

*Primary Examiner*—Alan Cariaso
(74) *Attorney, Agent, or Firm*—Wagner, Murabito & Hao LLP

(57) ABSTRACT

A flat panel display system utilizing a light pipe having vapor deposited highly reflective material on a light pipe. The flat panel display may be used in a portable electronic device. One embodiment discloses deposition of a highly reflective material (e.g., SiO2 or TiO2) around the non-viewing areas of a light pipe that provides light to the display screen. Front lighting embodiments and back lighting embodiments are described. One embodiment further discloses deposition of reflective material on the surface of microstructures of the light pipe to enhance light reflection and to prevent light escape. Another embodiment of the present invention discloses the coating or vapor deposition of phosphor material on the light pipe. This embodiment utilizes a blue light or IR light with the phosphor layer, to create a long lasting white light which is appealing for many portable electronic device displays.

22 Claims, 18 Drawing Sheets

500a

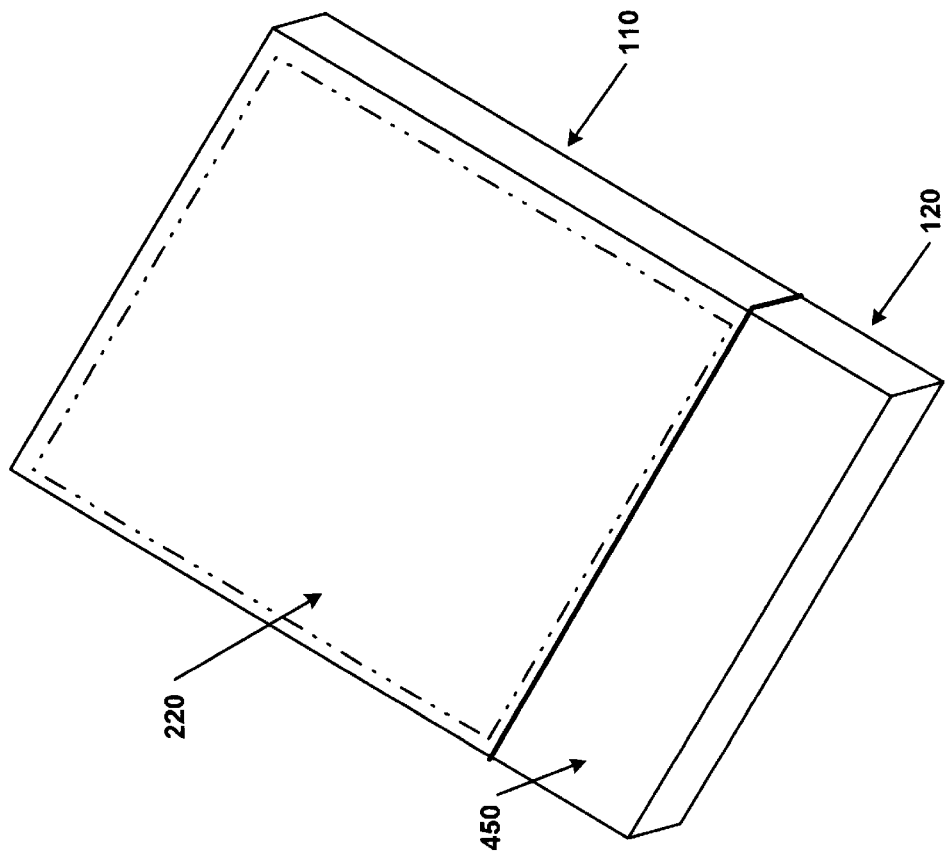

VAPOR DEPOSITION OF REFLECTIVE AND/OR PHOSPHORESCENT MATERIAL IN A LIGHTING SYSTEM

BACKGROUND OF THE INVENTION

1. Field of the Invention

The present invention relates to the field of display screens. More specifically, an embodiment of the present invention relates to the field of flat panel displays for portable electronic devices, such as personal digital assistants (PDAs), cell phones, pagers, digital watches etc.

2. Background of the Invention

Flat panel displays are commonly used in portable computer devices to display images and characters. The viewing area of some display panels is generally illuminated with at least one light source. The light source may be positioned behind or in front of the display matrix layer. The light from the light source may be distributed uniformly across the display panel. The efficiency of light distribution, uniformity of the distribution, intensity of the illumination and color of the light illuminating the display panel has always been a subject of development and improvement.

The efficiency of light distribution may be function of several factors including maximizing the use of the light source available and improving the light source used. Maximization of any resource can substantially be achieved by prevention of waste. In providing light to a display screen, light pipes are used to transfer the light from a light source across the display screen. Maximized use of the light source can be achieved using a light pipe that increases the amount of reflected light that illuminates the display matrix.

Flat panel display thickness is always a concern regarding portable electronic devices. Each layer of a flat panel display screen adds cost and thickness to the display subassembly. The display component of many portable electronic devices typically contributes a significant percentage of the overall thickness of the device. Therefore, it would be desirable to reduce the thickness of a flat panel display subassembly to thereby reduce the overall thickness of the portable electronic device.

Another factor of concern for maximizing illumination efficiency of a display screen is the color of the light used for illumination. For instance, a white color light is an appealing color for the users of portable devices under many environments. Commonly, white light may be achieved by using blue LEDs which illuminate an epoxy secured phosphor layer. These conventional displays have a very limited lifetime, maybe a few thousand hours due to heat related phosphor degradation. Consumers may not tolerate such a short lifetime for portable devices.

Thus a need exists for a portable computer system having a uniformly bright display screen which is efficiently illuminated. Furthermore, a need exists for a portable computer with a display screen properly illuminated to prevent undue stress on the user's eyes. Additionally, a need exists for such a flat panel display screen having a white color source with extended operating life.

SUMMARY OF THE INVENTION

Embodiments of the present invention provide a portable electronic device, e.g., a computer system, pager, cell phone, etc., with a thin, uniformly bright display screen, which is efficiently illuminated. Furthermore, one embodiment of the present invention provides a portable computer with a display screen properly illuminated to prevent undue stress on the user's eyes. Additionally, another embodiment of the present invention provides a white color light source with an improved operating life over conventional systems.

An efficient technique for illuminating a display screen in a portable computer is disclosed. One embodiment discloses vapor deposition of a highly reflective material around the non-viewing areas of a light pipe for providing light to a display matrix area of the display screen. The brightness enhancement film may be made of silicon oxide (SiO2) or titanium oxide (TiO2), or combination of metal oxides for instance. The vapor deposited reflector may be used in front lighting and backlighting embodiments. Another embodiment further discloses deposition of reflective material on the surface of microstructures (of the light pipe) to enhance light reflection and to prevent light escape. Another embodiment of the present invention discloses a display technique using vapor deposition or coating of a phosphor layer on a light pipe for producing long lasting white light.

With respect to the back lighting embodiments, the reflective material may be vapor deposited on the back surface, and some of the sides of the light pipe. With respect to the front lighting embodiments, reflective material may be vapor deposited on the sides of the light pipe.

More specifically, an embodiment of the present invention discloses a flat panel display assembly comprising a flat panel display layer for generating an image using discrete elements; and a planar light pipe disposed to receive light from a light source and for back-illuminating the flat panel display layer from a rear position, the planar light pipe comprising a reflective material deposited on its bottom surface, the reflective material deposited on the planar light pipe using a chemical vapor deposition process. An embodiment include the above and wherein the light pipe has thereon a vapor-deposition or coating deposited phosphor layer.

A second embodiment discloses a flat panel display assembly comprising a flat panel display layer for generating an image using discrete elements; a planar light pipe disposed to receive light from a light source and for illuminating the flat panel display layer from a front position, the planar light pipe comprising a reflective material deposited on the edges of the light pipe thereon using a chemical vapor deposition process.

BRIEF DESCRIPTION OF THE DRAWINGS

FIG. 9B illustrates bottom view of a planar light pipe and a planar light bar molded and masked for front lighting prior to vapor deposition or coating.

DETAILED DESCRIPTION OF THE INVENTION

Reference will now be made in detail to the preferred embodiments of the present invention, vapor deposition or coating of reflective material and phosphorescent material in a lighting system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Figure 1:
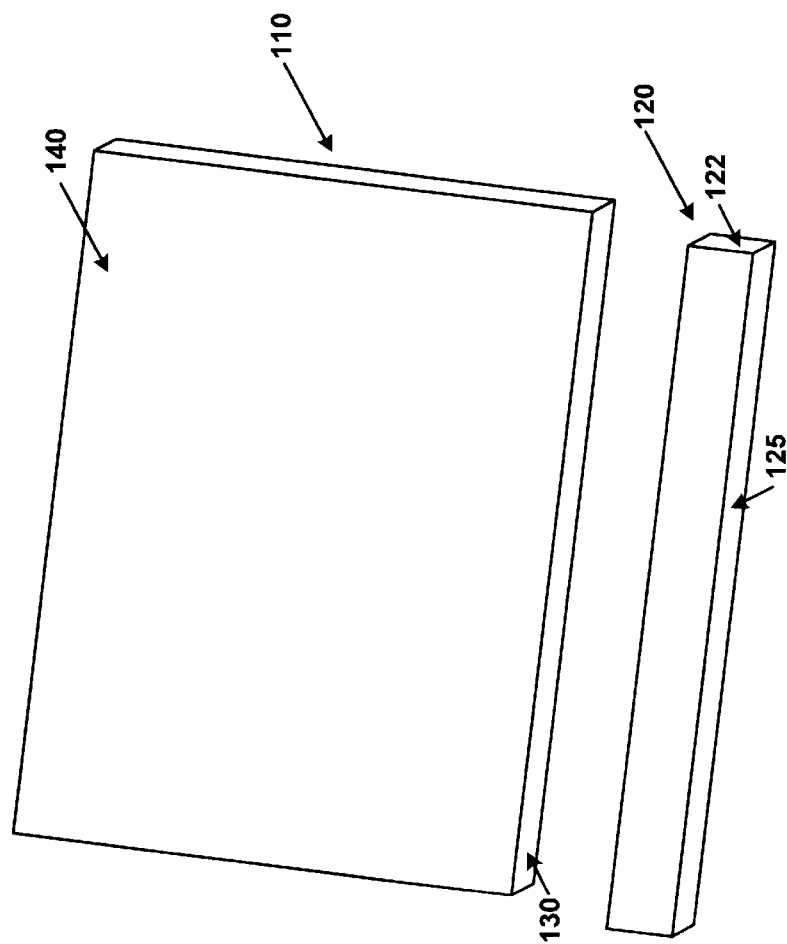
FIG. 1 illustrates a planar light pipe and a planar light bar used for illuminating display screen of a handheld computer.

FIG. 1 illustrates a planar light pipe 110 and a planar light bar 120 used for illuminating a display screen of an electronic device, e.g., a handheld computer. Planar light bar 120 receives light from a light source disposed along at least one edge 122, 125 of the planar light bar 120 or the edge opposite to edge 122 (not shown). Planar light pipe 110 receives light from planar light bar 120 and distributes the light substantially uniformly across viewing area 140. As described in more detail herein, the light pipe, in accordance with embodiments of the present invention, has deposited therein, using chemical vapor deposition techniques, a highly reflective material, along selected surfaces thereof.

In one embodiment, the highly reflective material may be silicon di-oxide (SiO2) or titanium di-oxide (TiO2) or combination of metal oxides.

Figure 2A:
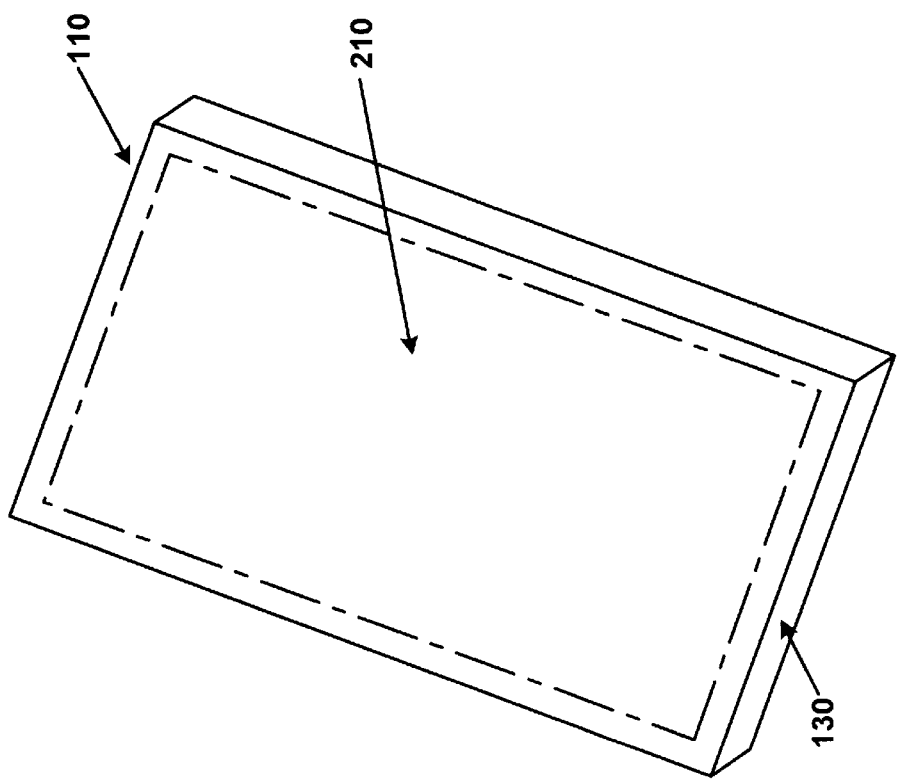
FIGS. 2A and 2B depict masked areas of the top and the bottom surfaces of a planar light pipe, used in front light illumination, before any vapor deposition or coating operation.
Figure 2B:
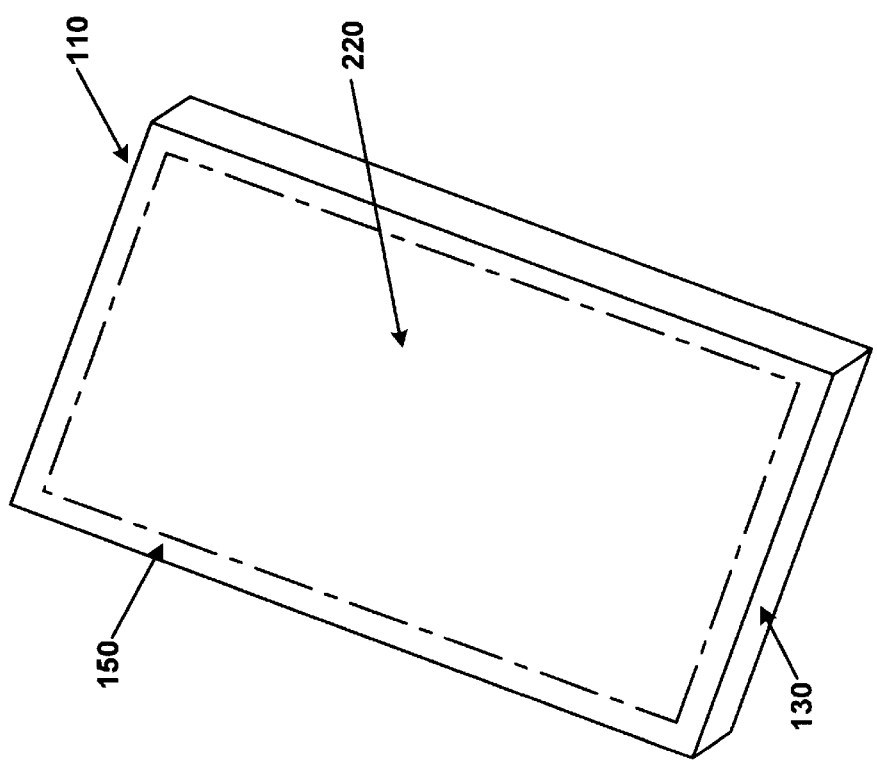

FIGS. 2A and 2B depict masked areas of the top and the bottom surfaces of planar light pipe 110 in accordance with a front light illumination embodiment. The masking regions relate to those areas that will not receive any vapor deposited reflective material. It is appreciated that the light pipe may be of glass or plastic material.

FIG. 2A depicts a portion of top view of planar light pipe 110 masked in a front light illumination system. Viewing area 210 of the top surface (and a similar region of the bottom surface shown in FIG. 2B) are both masked off and are not exposed to a subsequent chemical vapor deposition of the reflective material. Planar light pipe 110 is vaporized substantially (with the reflective material) in all areas except the masked areas. In effect, with respect to the front lighting system, only the edges 130 of the light pipe (and some small area along the periphery of the top and bottom surfaces) receive the vapor-deposited reflective material. It is appreciated that at least one edge remains masked in order to receive light from the light bar (not shown).

FIG. 2B depicts masking of the bottom surface of planar light pipe 110 in a front light illumination system. In a front light system, the light pipe is situated between the display matrix layer and eyes and therefore viewing area 210 remains transparent and free of any viewing obstacles thereby enabling a user to view the displayed characters and images of the display surface. The viewing area 220 is substantially the same size as the top surface viewing area 210 of FIG. 2A. Vaporization of planar light pipe 110 coats all surfaces of planar light pipe 110 except viewing areas 210 and 220. It is appreciated that at least one edge remains masked in order to receive light from the light bar (not shown).

Figure 3A:
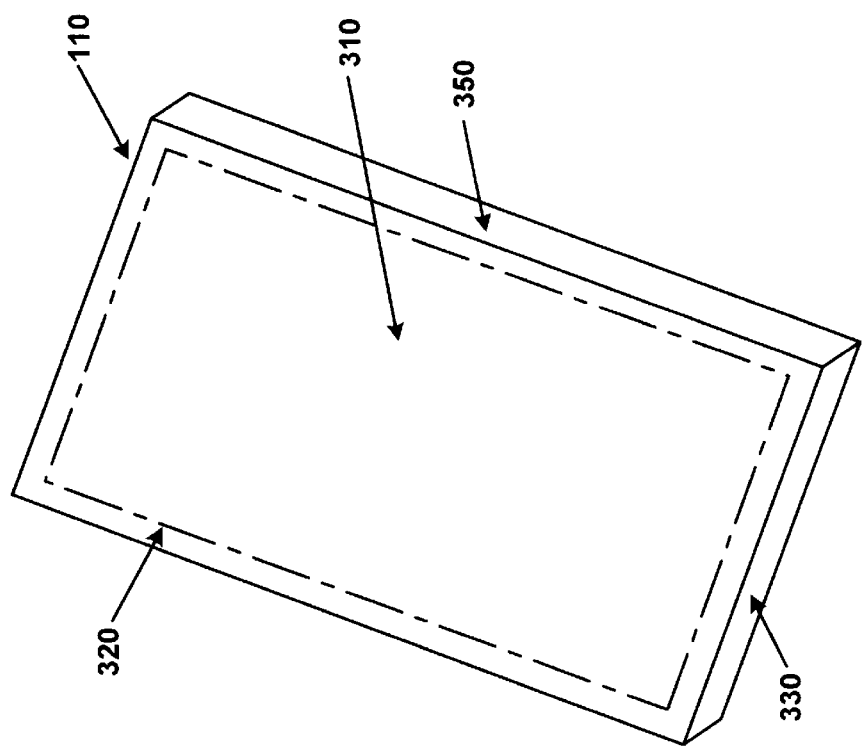
FIGS. 3A and 3B depict masked areas of the top and the bottom surfaces of a planar light pipe, used in back light illumination, before any vapor deposition or coating operation.
Figure 3B:
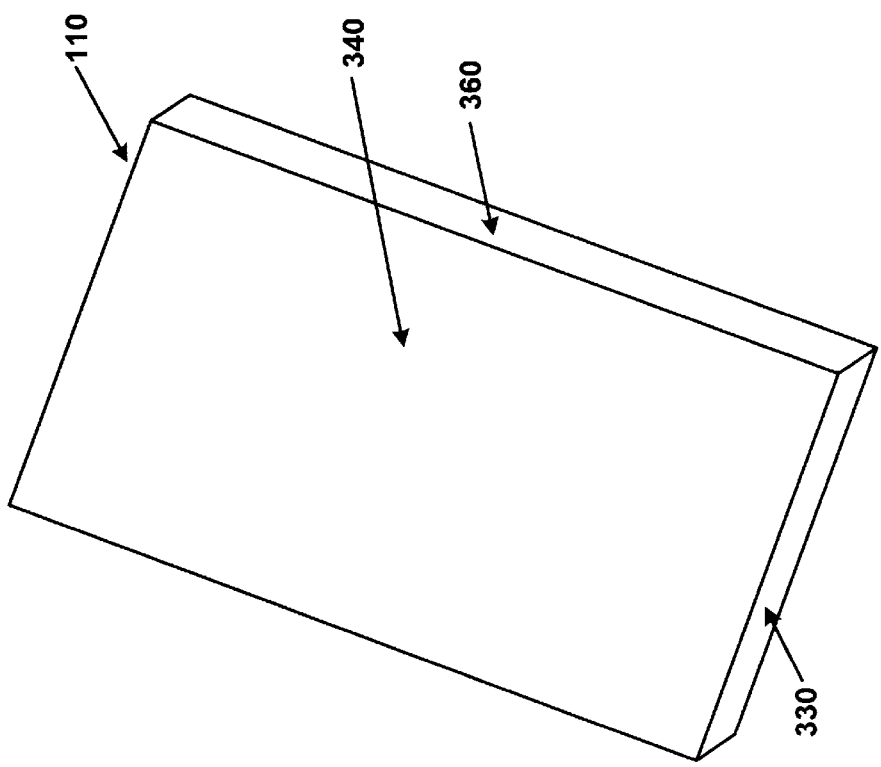

FIGS. 3A and 3B depict masked areas of the top and the bottom surfaces of planar light pipe 110 in a back light illumination embodiment. With respect to a rear or back illumination embodiment, the light pipe sits behind the display matrix layer and therefore the rear surface may be completely coated with the reflective material.

FIG. 3A depicts a masked portion of top surface 320 of planar light pipe 110. Viewing area portion 310 of the top surface of planar light pipe 110 is the masked portion of top surface 320 of planar light pipe 110. In a back light illuminating system (except for one edge which remains masked in order to receive light from the light bar) only viewing area 310 is otherwise masked and not exposed to the subsequent vaporization of highly reflective material. All other surfaces and edges are unmasked and are coated with a highly reflective material during the vapor deposition process.

In one embodiment, region 310 can include vapor deposited or coated yellowish phosphor for generating white light when exposed by blue LED light. In another embodiment, the phosphor may have red, green and blue components of or generating white light when exposed to an IR LED.

FIG. 3B depicts the lack of masking of the bottom surface of planar light pipe 110 in a back light illumination system. Planar light pipe 110's bottom surface 340, edges 350, 360 and the edge opposite to edge 330 (not shown) are unmasked and subject to vapor deposition.

In one embodiment, a plurality of microstructures (not shown) are properly located on the bottom surface 340 of planar light pipe 110. The microstructures cause light traveling along planar light pipe 110 to be reflected towards viewing area 310 to increase brightness and uniformity. By applying the reflective material to the back surface having microstructures, by vapor deposition, the material can be filled into the microstructure itself for maximum efficiency. This eliminates the need of any back reflecting film.

Figure 4:
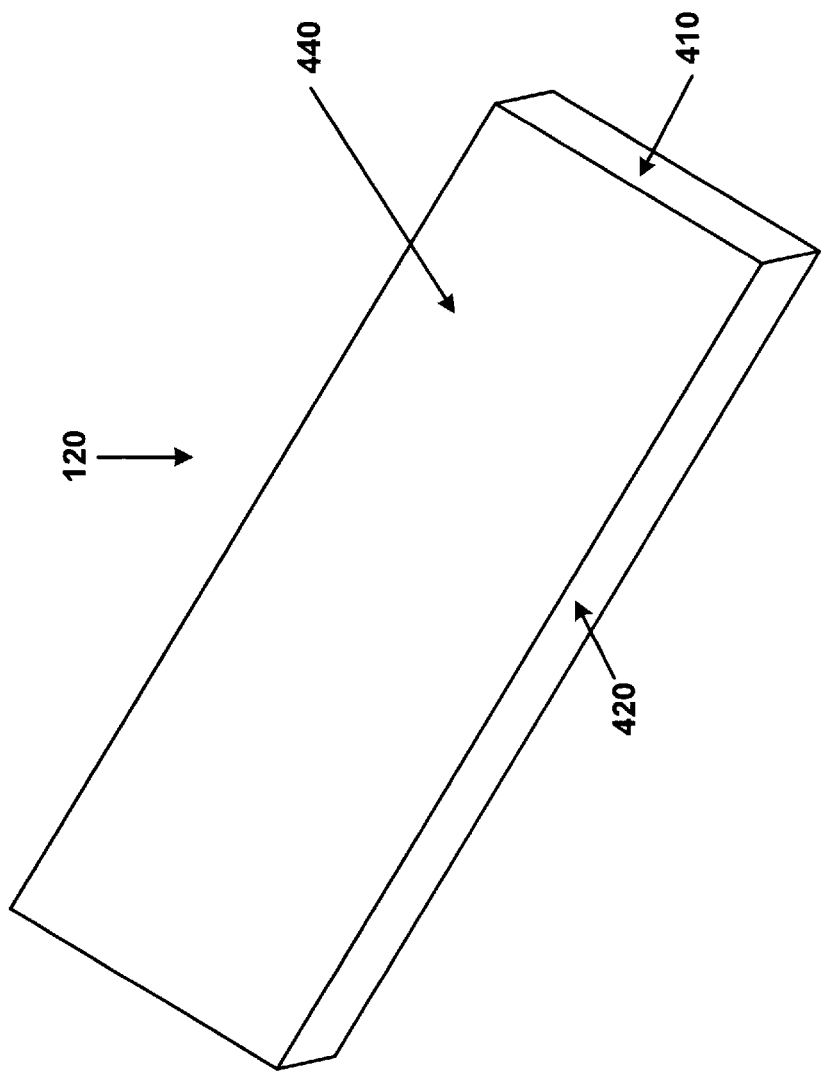
FIGS. 4 depicts masked areas of the top and the bottom surfaces of a planar light bar before any vapor deposition or coating operation.

FIG. 4 illustrates that the vapor deposition processes can also be applied to the light bar 120. FIGS. 4A and 4B are used to illustrate masked areas of the top and the bottom surfaces of planar light bar 120 before any vaporization operation.

FIG. 4 is top view of planar light bar 120. Planar light bar 120 receives light from at least one light source, which may be located along at least one edge of edges 420, 410. At least one other edge illuminates the light pipe 110. Assuming the light source is positioned at edge 410 and edge 420 optically couples with the light pipe, then all other edges and surfaces are coated with the reflective material. These surfaces are left unmasked and exposed to be deposited with highly reflective material during a vapor deposition process. The only masked edges of planar light bar 120 are edges 410 and 420, in this example.

Figure 5A:
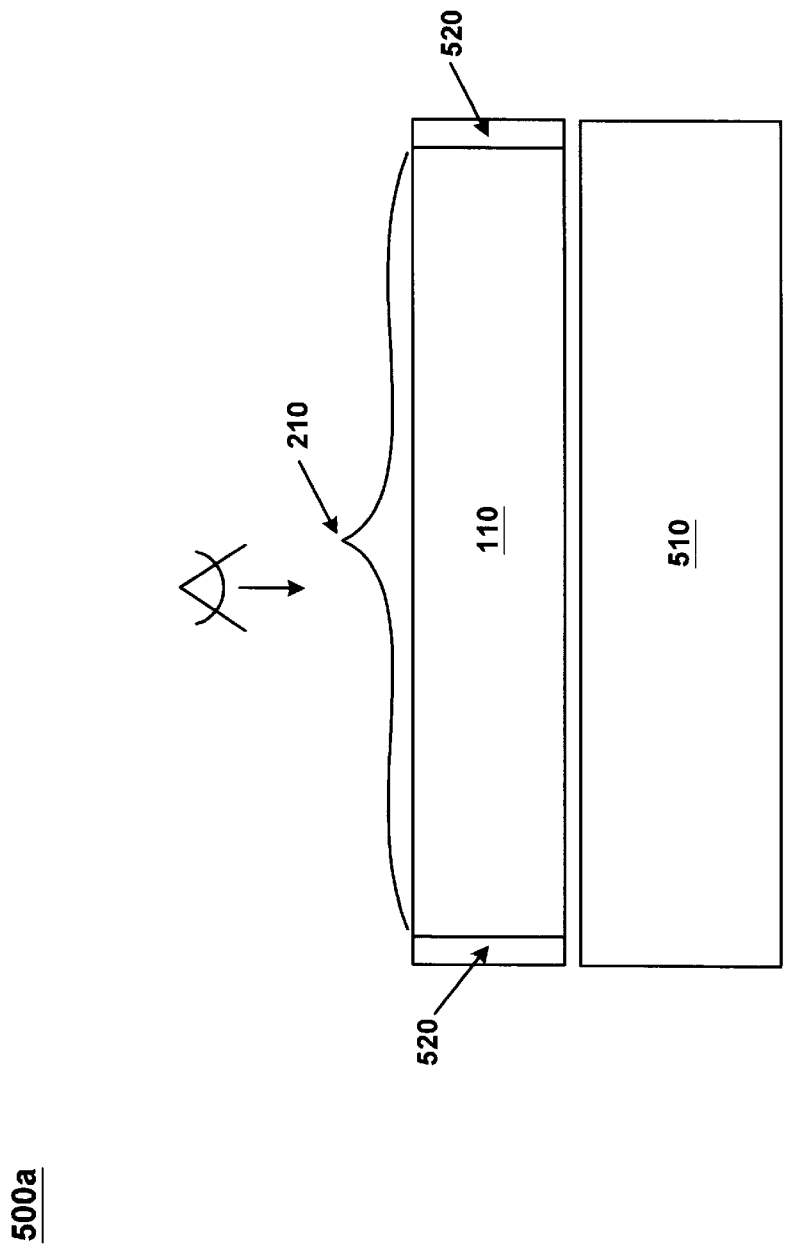
FIG. 5A depicts a cross section of a planar light pipe and a display screen in a front light illumination assembly in accordance with an embodiment of the present invention.

FIG. 5A depicts a cross section 500a of a flat panel display screen including a planar light pipe 110 and a display matrix layer 510 in a front light illumination assembly. In one example, layer 510 can be a liquid crystal display (LCD) layer. Highly reflective material 520 deposited along the edges of light pipe 110, as described in FIGS. 2A and 2B, causes reflection of that portion of light hitting the edges to be reflected back into planar light pipe 110 to illuminate layer 510. Furthermore, highly reflective material 520 deposited along the edges of planar light pipe 110 also prevents light from escaping from the planar light pipe 110. A user can view displayed images and characters on display screen 510 through transparent viewing area 210.

Figure 5B:
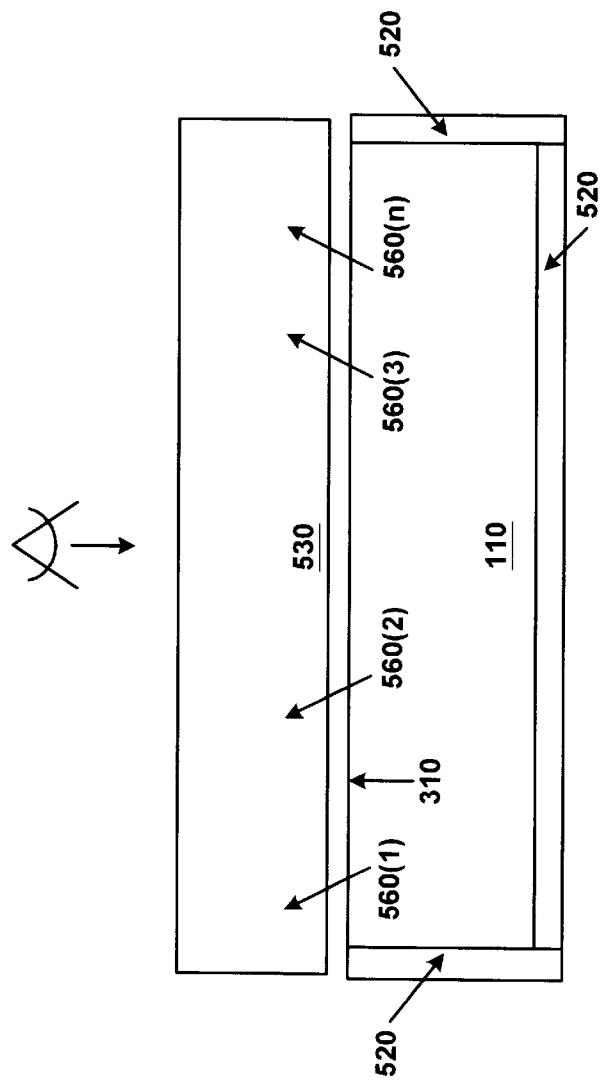
FIG. 5B depicts a cross section of a planar light pipe and a display screen in a back light illumination assembly in accordance with an embodiment of the present invention.

FIG. 5B depicts cross section 500b of a flat panel display screen including a planar light pipe 110 and flat panel display matrix layer 530 in a back light illumination assembly. Highly reflective material 520 deposited along the edges (and bottom) of light pipe 110, as described in FIGS. 3A and 3B, prevents light from escaping and increases brightness. Light reflected by microstructures (not shown) upwardly along general direction 560 (i) illuminates display screen 530. In one embodiment, the top surface 310 may contain a vapor deposited or coated phosphor layer.

Figure 6A:
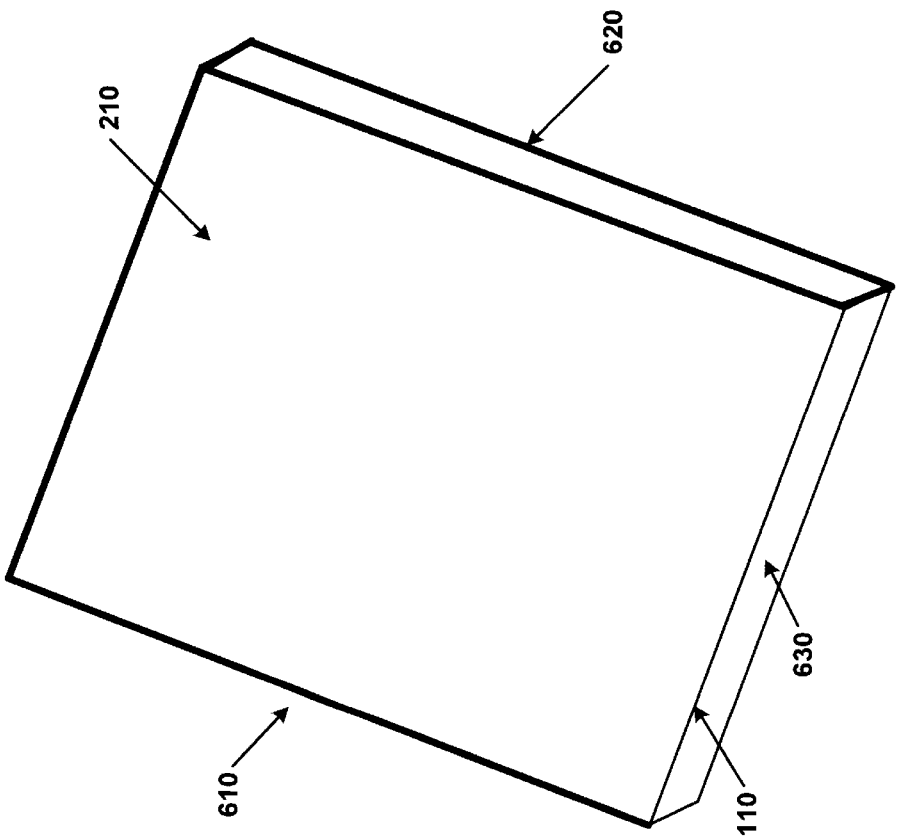
FIG. 6A illustrates the top view of a vaporized planar light pipe molded with a plastic frame in a front light illumination assembly in accordance with an embodiment of the present invention.

FIG. 6A illustrates the top view 600a of a vapor-deposited planer light pipe 110 molded with a plastic frame 620 in a front light illumination embodiment. Viewing portion 210 (upper and lower surfaces) of planar light pipe 110 is a transparent and a user can observe images and characters displayed on the opposite side of viewing area 210. Planar light pipe 110 portion receives light from a light source through front edge 630.

Figure 6B:
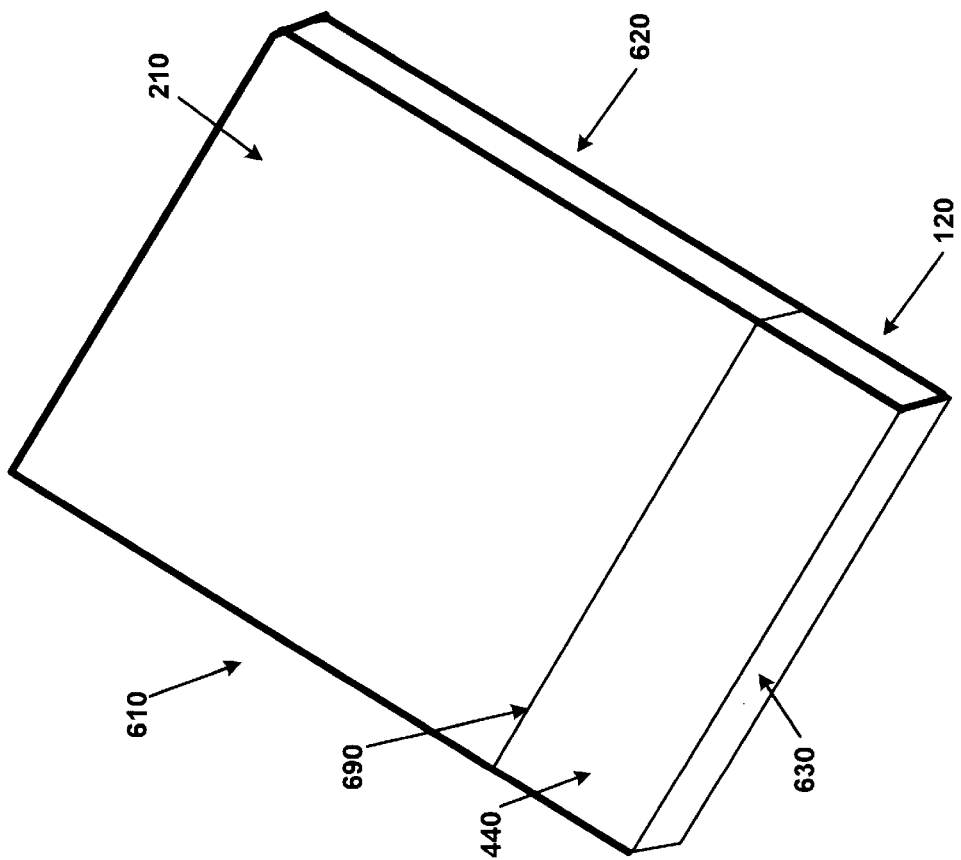
FIG. 6B illustrates the top view of a vaporized planar light pipe molded with a plastic frame, a planar light bar and brightness enhancement film (BEF) in a front light illumination assembly.

FIG. 6B depicts a vapor-deposited planar light pipe 110 with a planar light bar 120 molded with a plastic frame in a front light illumination embodiment. It is appreciated that viewing portion 210 of planar light pipe 110 is prepared in accordance with FIGS. 2A and 2B and planar light bar 120 is vapor-deposited in accordance with FIG. 4. View 600b illustrates vapor-deposited planar light pipe 110, vapor-deposited planar light bar 120, and plastic frame 620 molded to form a single component.

It is appreciated that planar light pipe 110, planar light bar 120, Brightness Enhancement Film 690 and plastic frame 620 may be molded together forming a single component prior to the vapor deposition process.

Figure 6C:
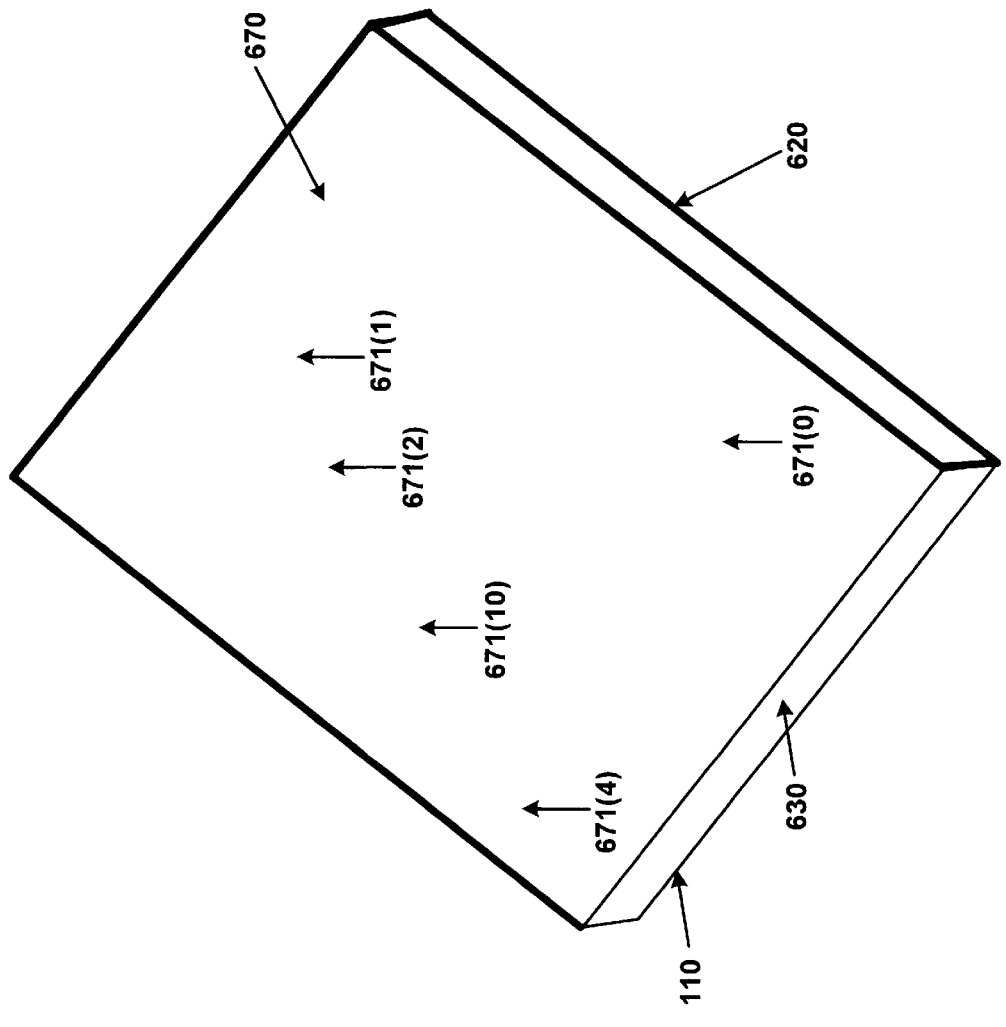
FIG. 6C illustrates the top view of a vaporized planar light pipe molded with plastic frame in a back light illumination.

FIG. 6C illustrates the top view 600c of a vapor-deposited planer light pipe 110 molded with a plastic frame 620 in a back light illumination embodiment. Planar light pipe 110 portion receives light through edge 630. A plurality of microstructures (not shown) are properly located on the bottom surface of planar light pipe 120. Light traveling along planar light pipe 110 are redirected upwardly upon contact with the plurality of microstructures. Viewing area 670 is clear from vapor deposition, and light traveling along planar light pipe portion can travel outwardly in the general direction of 671(j). Planar light pipe 110 is coated with highly reflective material in accordance with process 300. In one embodiment, region 670 may be coated or vapor-deposited with a phosphor layer.

Figure 6D:
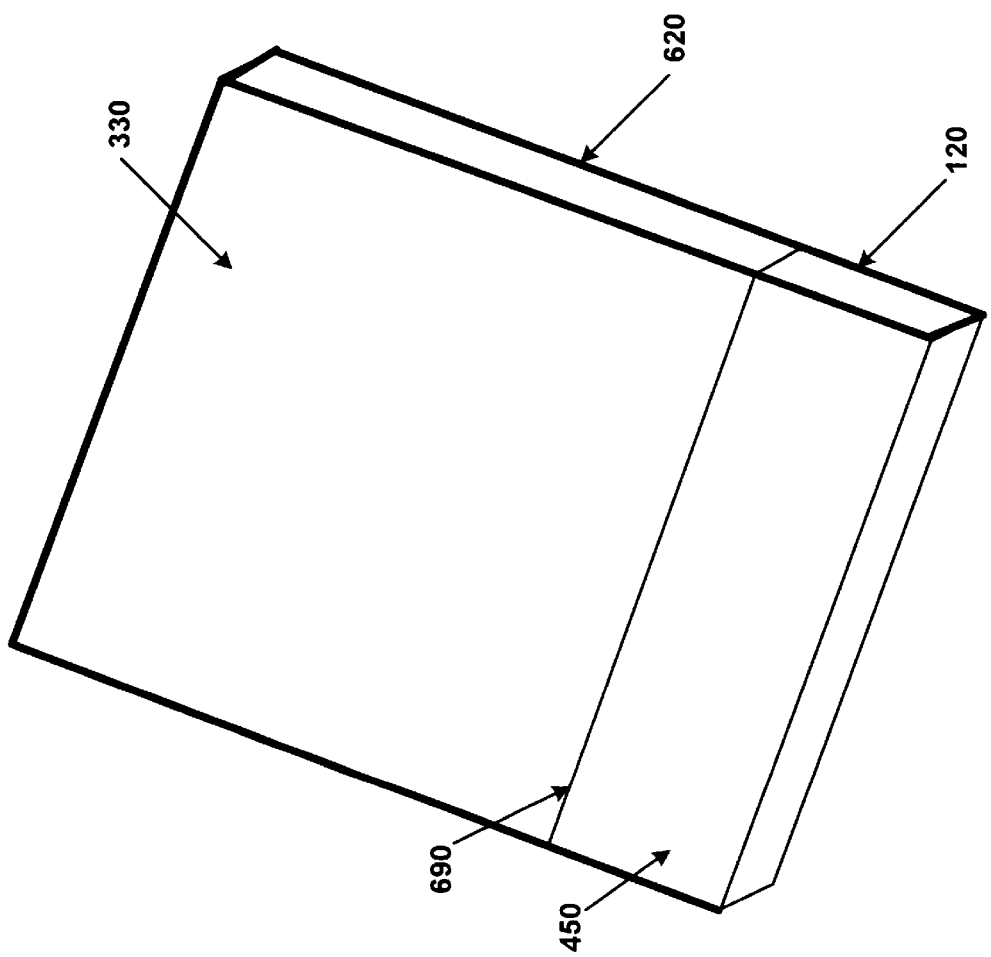
FIG. 6D illustrates the bottom view of a vaporized planar light pipe molded with plastic frame, planar light bar and BEF in a back light illumination.

FIG. 6D illustrates a view 600d of a vapor-deposited planar light pipe 110 and planar light bar 120 with molded with plastic frame 620 in a back light illumination embodiment. Planar light pipe 110's bottom surface 330 and planar light bar 120's bottom surface 450 are substantially coated with a highly reflective material during a vapor deposition process.

It is appreciated that planar light pipe 110, planer light bar 120, and BEF 690 may be molded with plastic frame 620 forming a single component prior to the vapor deposition process. It is appreciated that vapor-deposited reflective material may be applied to the light pipe before any frame material, or other mechanical structures, are molded thereon. Alternatively, the vapor-deposited reflective material may be applied to the light pipe after any frame material, or other mechanical structures, are molded thereon.

Figure 7:
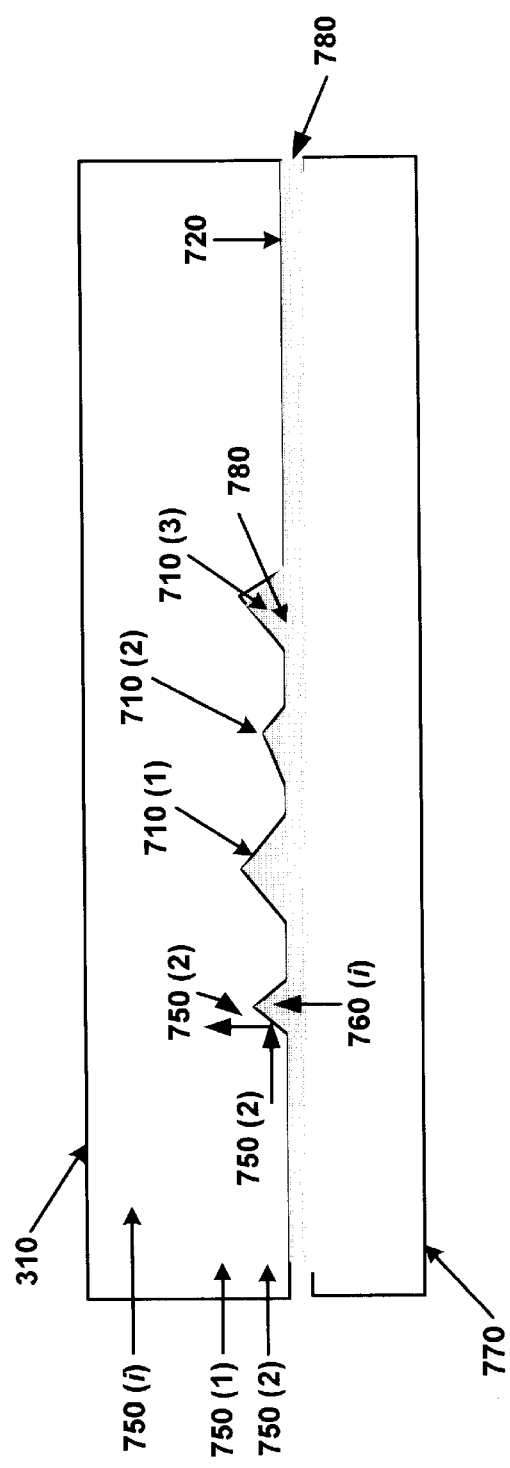
FIG. 7 illustrates vaporized molecules filling the air gaps between microstructures and a highly reflective material disposed along a bottom surface of a light pipe in accordance with an embodiment of the present invention.

FIG. 7 illustrates a cross section 700 of a vapor-deposited planar light pipe 110 in a back light illumination system. Microstructures 710(i) are properly placed along the bottom surface 720 of planar light pipe 110. Light traveling in a general direction 750(i) hits microstructure 710(j) and gets redirected upwardly towards viewing area 310, thus illuminating a display screen of a handheld computer. Reflective material in 770 deposited against the bottom surface of planar light pipe 110 fills the space 780 of the microstructures. Material area 780 is highly exaggerated for the purpose of representation and is occupied with highly reflective material 770 deposited during vapor deposition.

Highly reflective material 770 coats the very small cavities 760(i) in the backs of microstructures 710(j). Coating the backside of cavities 710(j) enhances the reflection of incident light 750 and prevents light from escaping upon light contact with microstructures 710(j).

Figure 8:
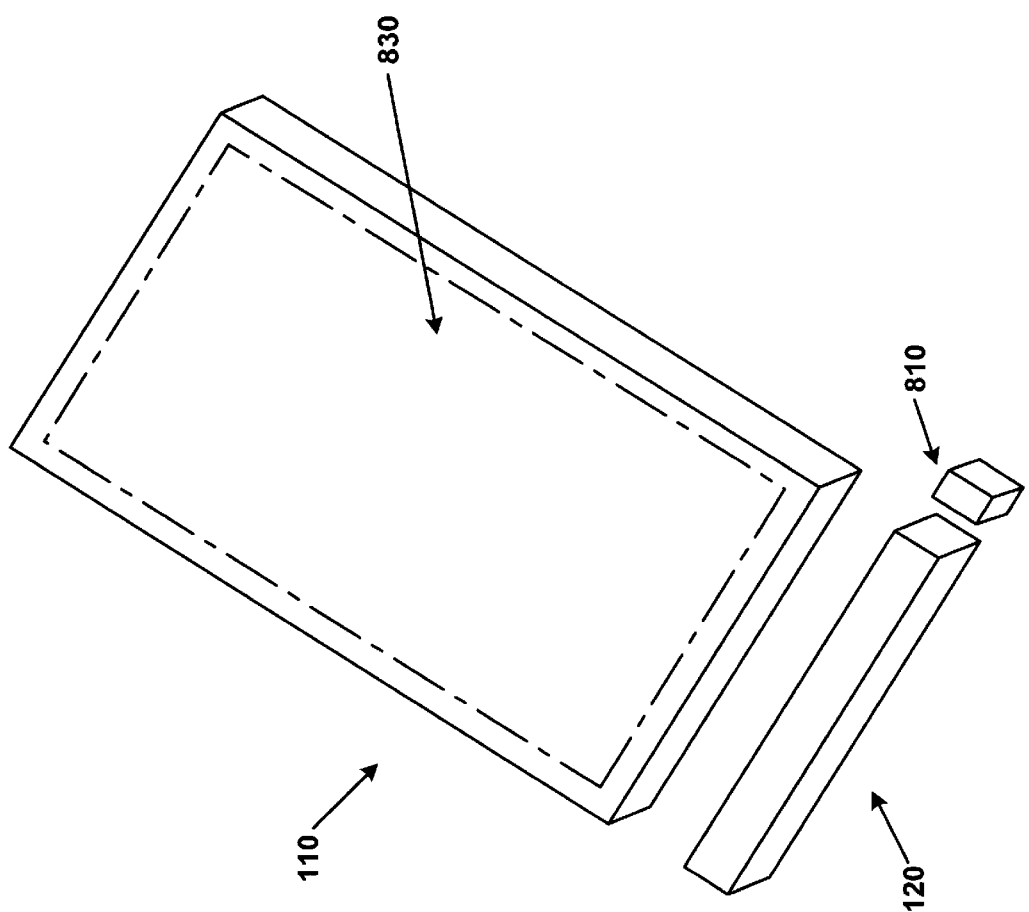
FIG. 8 is an embodiment of this invention where a long lasting white light illumination is supplied to the display screen of a portable computer.

FIG. 8 illustrates an embodiment of this invention where light source 810 is a Light Emitting Diode (LED) emitting blue color light. Blue light from light source 810 is piped inside planar light pipe 110 via planar light bar 120. In one embodiment of the present invention planar light pipe 110's viewing area 830 is coated with phosphorous molecules. In another embodiment of this invention viewing area 830 is printed with phosphorous molecules. The remainder of the light pipe 110 and the light bar 120 may be coated with vapor-deposited highly reflective material as described above with respect to the backlighting embodiments.

Blue light from light source 810 travels along planar light pipe 110. The blue light is redirected upwardly when hitting microstructures 710(i) of FIG. 7. Redirected blue light shining on yellow phosphorous material causes the phosphor to release white light thereby causing the viewing area to be lit with white light. In addition, redirected IR light shining on an RGB phosphorous material causes the phosphor to release white light. Also, by applying a phosphor material to the front surface where all the light is being directed, higher brightness and better uniformity can be achieved. In some cases, it is appreciated that blue LEDs are cheaper, more reliable and have longer lifetimes than white LEDs.

Embodiments of the present invention disclose a means for generating white light with substantially longer life. A conventional source for generating white light is a blue light emitting LED encapsulated in epoxy or epoxy mixed with yellow phosphorous material. Heat generated by an LED combined with the ambient temperature causes the epoxy to become cloudy and material break down of phosphorous, which results in a relatively short lifetime. The present invention generates white light where the light source has substantially the same life time as a typical LED, over approximately 50,000 hours.

Figure 9A:
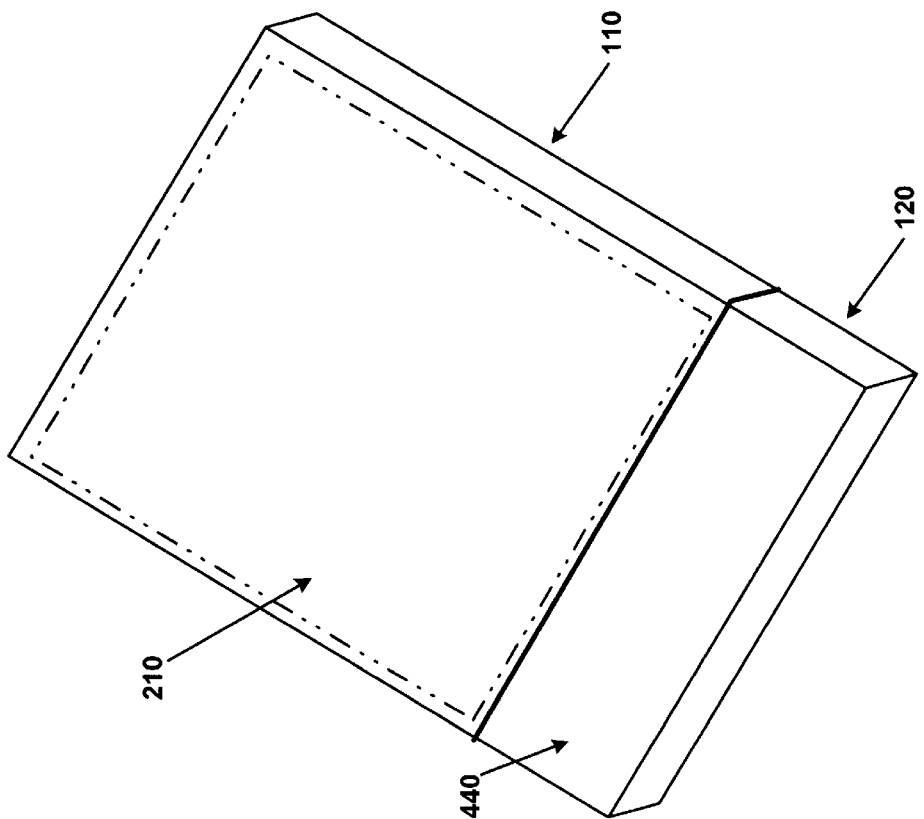
FIG. 9A illustrates top view of a planar light pipe and a planar light bar molded and masked for front lighting prior to vapor deposition or coating.

FIG. 9A illustrates top view 900a of planar light pipe 110 co-molded with planar light bar 120 and masked prior to vapor deposition in a front light illumination system.

FIG. 9B illustrates bottom view 900b of planar light pipe 110 co-molded with planar light bar 120. Viewing area 220 is masked in a front light illumination system prior to vapor deposition.

Figure 10A:
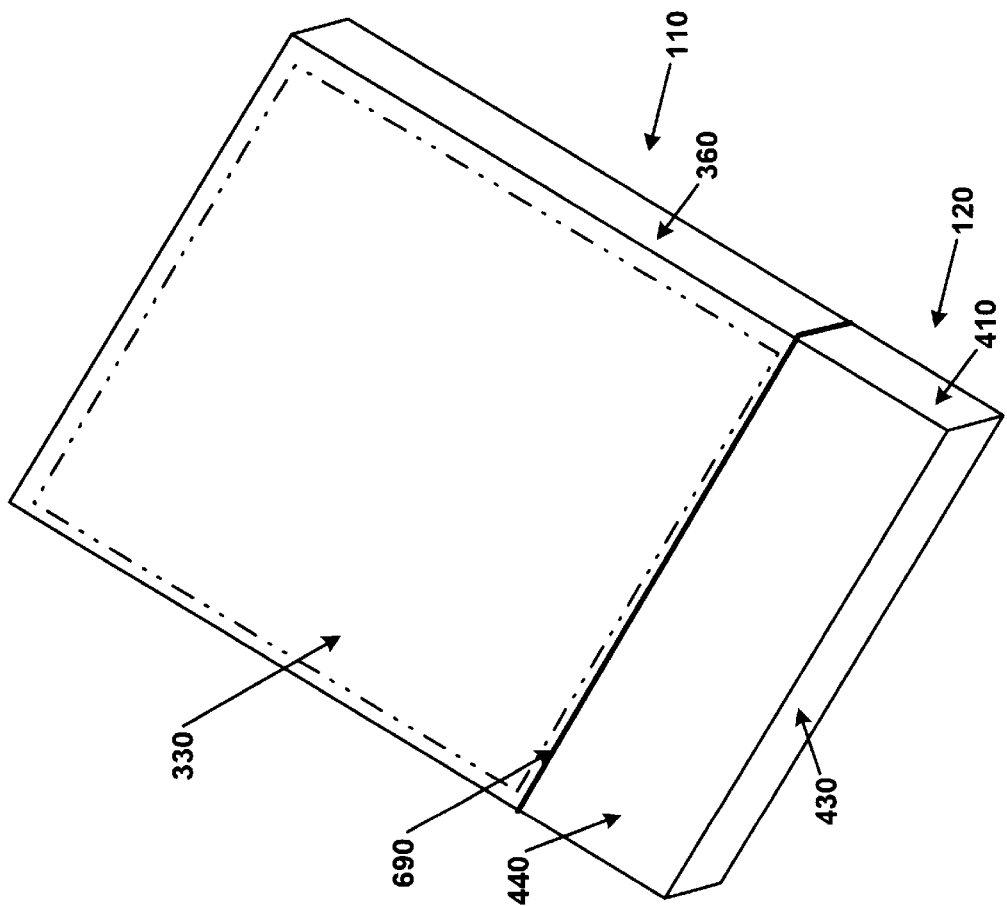
FIG. 10A illustrates top view of a planar light pipe and a planar light bar molded and masked for back lighting prior to vapor deposition or coating.

FIG. 10A illustrates top view 1000a of planar light pipe 110 co-molded with planar light bar 120. Top surface 330 is masked for back light illumination prior to vapor deposition. Edges 430, 410, 360 and planar light bar top surface 440 are unmasked.

Figure 10B:
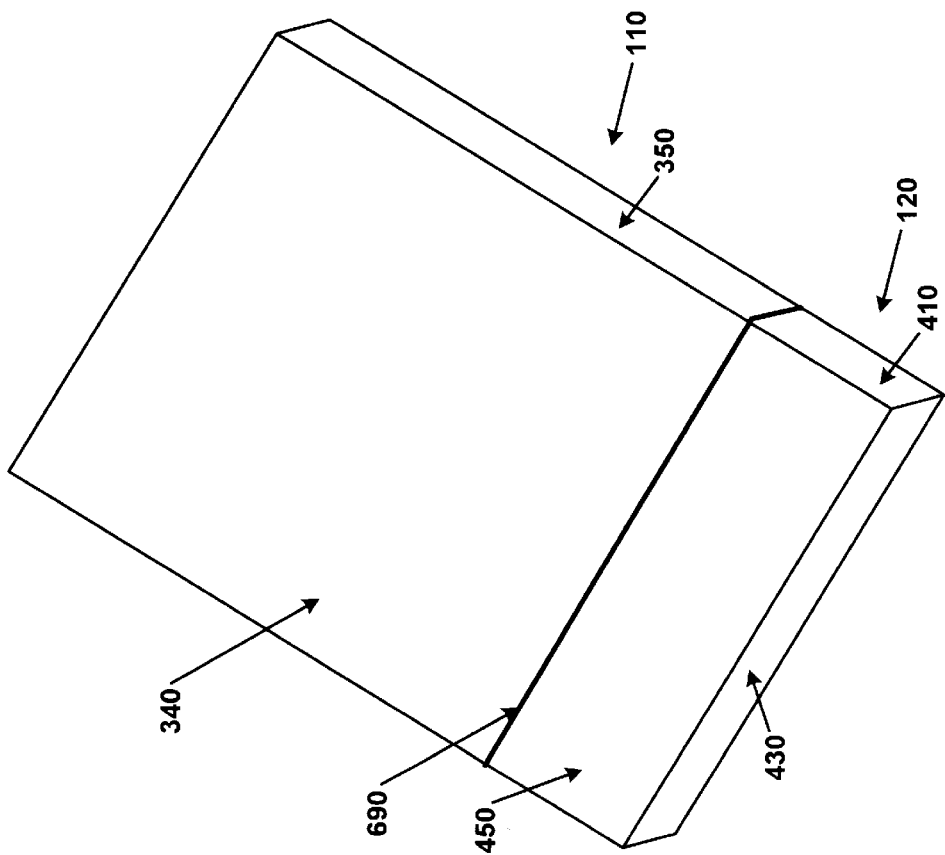
FIG. 10B illustrates bottom view of a planar light pipe and a planar light bar molded and masked for back lighting prior to vapor deposition or coating.

FIG. 10B illustrates bottom view 1000b of planar light pipe 110 co-molded with planar light bar 120. Bottom surface 340 of planar light pipe 110 and bottom surface 450 of light bar 120 are unmasked. Edges 350, 410 and 430 are also unmasked for back light illumination prior to vapor deposition.

In summary the present invention provides an improved illumination for display screen in a portable electronic devices, e.g., portable computers. In accordance with the present invention a portable computer system is equipped with an enhanced front light or back light illumination system. Furthermore, the present invention discloses a white light source for the display screen of a portable computer with improved brightness and life span in order of magnitudes.

The foregoing description of specific embodiment of the present invention has been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A flat panel display assembly comprising:
    a flat panel display layer for generating an image using discrete elements; and
    a planar light pipe disposed to receive light from a light source and for illuminating said flat panel display layer, said planar light pipe comprising a reflective coating deposited thereon using a chemical vapor deposition process;
    wherein said reflective coating is applied to selected edges of said planar light pipe and along the periphery of a top surface and a bottom surface of said planar light pipe.

2. A flat panel display assembly as described in claim 1 wherein said reflective coating is comprised of titanium di-oxide.

3. A flat panel display assembly as described in claim 1 wherein said reflective coating is comprised of silicon di-oxide.

4. A flat panel display assembly as described in claim 1 wherein said reflective coating is comprised of a combination of silicon di-oxide and titanium di-oxide.

5. A flat panel display assembly as described in claim 1 wherein said reflective coating is comprised of a metallic oxide.

6. A flat panel display assembly as described in claim 1 wherein said planar light pipe is disposed to provide front lighting of said flat panel display layer.

7. A flat panel display assembly as described in claim 1 wherein said reflective coating substantially covers said bottom surface of said planar light pipe.

8. A flat panel display assembly as described in claim 7 wherein said planar light pipe is disposed to provide rear lighting of said flat panel display layer.

9. A flat panel display assembly as described in claim 1 wherein said flat panel display layer is a liquid crystal display (LCD).

10. A flat panel display assembly comprising:
    a flat panel display layer for generating an image using discrete elements; and
    a planar light pipe disposed to receive light from a light source and for back-illuminating said flat panel display layer from a rear position, said planar light pipe comprising a reflective coating deposited on the periphery of its bottom and top surfaces, said reflective coating deposited on said planar light pipe using a chemical vapor deposition process, wherein said reflective coating is also applied to selected edges of said planar light pipe.

11. A flat panel display assembly as described in claim 10 wherein said reflective coating is comprised of titanium di-oxide.

12. A flat panel display assembly as described in claim 10 wherein said reflective coating is comprised of silicon di-oxide.

13. A flat panel display assembly as described in claim 10 wherein said reflective coating is comprised of a combination of titanium di-oxide and silicon di-oxide.

14. A flat panel display assembly as described in claim 10 wherein said reflective coating is comprised of a metallic oxide.

15. A flat panel display assembly as described in claim 10 wherein said flat panel display layer is a liquid crystal display (LCD).

16. A flat panel display assembly as described in claim 10 wherein said planar light pipe also comprises a phosphor layer deposited on a top surface thereof using a chemical vapor deposition process.

17. A flat panel display assembly as described in claim 10 wherein said planar light pipe also comprises a phosphor layer deposited on a top surface thereof.

18. A flat panel display assembly comprising:
    a flat panel display layer for generating an image using discrete elements; and
    a planar light pipe disposed to receive light from a light source and for illuminating said flat panel display layer from a front position, said planar light pipe comprising a reflective coating deposited thereon using a chemical vapor deposition process, wherein said reflective coating is applied to selected edges of said planar light pipe and wherein said reflective coating is additionally applied to the periphery of bottom and top surfaces of said planar light pipe.

19. A flat panel display assembly as described in claim 18 wherein said reflective coating is comprised of titanium di-oxide.

20. A flat panel display assembly as described in claim 18 wherein said reflective coating is comprised of silicon di-oxide.

21. A flat panel display assembly as described in claim 18 wherein said flat panel display layer is a liquid crystal display (LCD).

22. A flat panel display assembly as described in claim 18 wherein said flat panel display layer is coated with phosphorous material.

\* \* \* \* \*